Patented Feb. 19, 1946

2,395,029

UNITED STATES PATENT OFFICE 2,395,029

METHOD OF REDUCING IRON ORES

Thaddeus F. Baily, Canton, Ohio

No Drawing. Application October 25, 1944,
Serial No. 560,339

5 Claims. (Cl. 75—21)

The invention relates to a method of reducing iron ores containing a metallic oxide which is more readily reducible than iron oxide, such as nickel oxide or cobalt oxide; and a metallic oxide which is less readily reducible than iron oxide, such as chromium oxide, manganese oxide or vanadium oxide, wherein only sufficient reducing agent is added to reduce the nickel and cobalt along with part of the iron, producing a nickel-iron alloy; the remainder of the iron oxide, along with the chromium, manganese, and vanadium oxides forming a fusible slag, which may be subsequently processed to recover these metallic elements, producing a ferrous alloy of these elements.

Many ores such as the Mayari and Moa deposits in Cuba as well as ores in northwestern part of the United States, containing appreciable amounts of iron, also contain other elements used in the production of alloy steels, such as nickel, cobalt, chromium, manganese and vanadium, the first two of which are more readily reducible than iron, while the others are less readily reducible than iron.

Although there are enormous deposits of such ores they have not been used commercially in the manufacture of steel because under present practice in the reduction of such ores high carbon pig iron is made containing all of the metallic elements in the ore. In subsequent processing of this metal to steel, all of the chromium is oxidized along with the carbon, resulting in a loss of this element, and producing a high chromium oxide slag which is very difficult to handle, making such ores practically unusable in present steel-making operations. Further, in present practice, all of the iron of the ore is reduced with the nickel, limiting the percentage of nickel in the metal to the proportion of nickel and iron occurring in the ore.

The present invention contemplates a method for the reduction of such ores containing nickel oxide and chromium oxide for instance, in which I recover substantially all of the nickel and part of the iron as a nickel iron alloy, the percentage of nickel in the reduced metal depending upon the amount of iron reduced.

The remainder of the iron, as iron oxide, together with the chromium oxide, or other oxides less readily reducible than iron oxide, combine with the gangue of the ore forming a fusible slag with the addition of flux if required. This slag may then be processed to recover the iron and the chromium or other metallic oxides less readily reducible than iron oxide forming a chrome-iron alloy.

By using sufficient reducing agent to reduce only a portion of the iron and all of the nickel or cobalt oxides, leaving a portion of the iron unreduced in the slag, it is possible to produce a nickel, cobalt, iron alloy low in other alloys such as chromium, manganese or vanadium and to take off a fluid slag containing the remainder of the iron and the other metallic constituents in oxide form.

By varying the amount of reducing agent used in the process I am able to produce a nickel iron alloy containing from 2% to 16% nickel from an ore containing 1% nickel, 2.5% chromium and 50% iron, the chromium content being as low as .02%, and by varying the temperature at which the reduction operation is carried on I can control the carbon content from as low as .02% to above 2% without reducing any chromium.

If the operation is carried on at a high temperature, such as the temperature required for the production of low carbon steels, and with insufficient carbon to reduce all of the iron, the product will be a low carbon nickel iron alloy, low in chromium; while if the operation is carried on at the temperature at which pig iron is fluid the product may be a high carbon, low chromium, nickel iron alloy.

The slag resulting from the nickel iron reduction operation may then be treated, while still fluid, so as to produce metal containing the balance of the iron and all of the chromium, or other metallic oxides remaining in the slag.

It will thus be obvious that I am able to produce two distinct iron alloys from ores which when processed by the usual methods would produce alloy pig iron containing substantially all of the metallic constituents in the ore in the proportions in which they occur in the ore.

Thus by utilizing the improved process, ores of the character above indicated, of which there is an almost limitless supply, can be advantageously processed to provide the nickel required for the production of nickel steels of any desired nickel analysis from 1.5% nickel to stainless grades, and that this nickel is obtained by a simple metallurgical operation.

It should also be noted that iron ores containing nickel cannot be used in the production of ordinary grades of nickel-free steels, as it is impossible to reduce the iron without also reducing the nickel, forming a nickel-iron alloy. Therefore, such ores are usable only for the production of nickel steels, and unless control is exercised in the reduction operation, as by my method described herein their use is extremely limited, if not entirely impractical in present alloy steel-making operations, their only use being for the production of alloy iron castings. It is thus to be seen that the use of this process will make available for alloy steel-making vast deposits of iron ore, which are practically unusable in present steel-making operations.

It will thus be seen that by the use of this improved method these ores are made usable, both the iron and nickel being recovered in such form as is desirable for the production of all grades of nickel steels, and the other metals, such as chromium, manganese and vanadium, contained in such ores, may be recovered as ferro alloys free from nickel by processing the slag from the nickel iron reduction operation.

If cobalt is present in the ore, it will be reduced along with the nickel and will be present in the steel in the same ratio to the nickel as it occurs in the ore. The presence of cobalt in nickel steels, especially for armor plate, is very desirable as it increases the strength and elastic limit with relatively little loss of ductility, and increases the tenacity and resistance to shock or shattering, the usual nickel-cobalt ratios appearing in the ore being within the desirable range for armor plate.

By my process I am able to produce from such ores a low carbon nickel-iron alloy free from chromium, which may be readily finished in an electric or open hearth furnace to steel specifications, the metal containing any percentage of nickel desired in the finished steel.

My new process may be carried out to advantage in a conventional arc type electric steel making furnace or an electric furnace similar to the type used in the production of ferro-alloys; or it may be carried out in a shaft type furnace similar in principle to that described in my Patent No. 2,066,665, in which latter case, the nickel and the desired quantity of iron may be reduced in the shaft of the furnace while freely falling in counterflow to the reducing gases, or the shaft type furnace mentioned may be operated so that the shaft is used primarily for roasting, calcining or preheating the charge, the reduction operation being carried on in the hearth of the furnace in the same general manner as in the all-electric furnace operation mentioned.

Below is shown diagrammatically the manner in which the process may be carried out with an ore of given analysis.

In treating ore analyzing on a dry basis:

|  | Percent |
|---|---|
| Iron | 45.15 |
| Nickel | 1.40 |
| Chromium | 2.36 |
| Alumina | 4.86 |
| Silica | 5.52 |
| Magnesia | .60 |
| Free moisture | 3.49 |
| Ign. loss | 11.92 | by varying the amount of reducing agent and the temperature at which the reduction was carried on, I have been able to produce metal of the following range of analyses:

|  | Ni | Cr | C |
|---|---|---|---|
|  | Per cent | Per cent | Per cent |
| #1 | 4.38 | 2.08 | 3.41 |
| #2 | 3.25 | .25 | 3.07 |
| #3 | 3.43 | .02 | 1.98 |
| #4 | 4.05 | .00 | .035 |
| #5 | 4.19 | .01 | .049 |
| #6 | 6.32 | .51 | .044 |

I have also produced armor plate from ore containing

|  | Percent |
|---|---|
| Iron | 46.35 |
| Nickel | 1.14 |
| Cobalt | .19 |
| Chromium | 2.97 | all the nickel, cobalt, chromium and iron in the armor plate coming from the ore, the nickel, cobalt and part of the iron being first reduced forming an alloy containing substantially all of the nickel and cobalt in the ore, and low in chromium and carbon, the slag from the reduction operation being removed from the furnace, and the metal being finished under a reducing slag with the addition of the required ferro-alloys, to armor plate specifications.

The slag from the nickel reduction operation was then processed by the addition of coke, and a high carbon 7% chrome-iron alloy produced containing all the iron and chromium contained in the slag from the primary reduction operation, the slag from this chrome reduction operation being similar in analysis to a blast furnace slag.

I have thus been able to produce a high grade nickel steel suitable for armor plate from an ore of this character, without the addition of nickel,

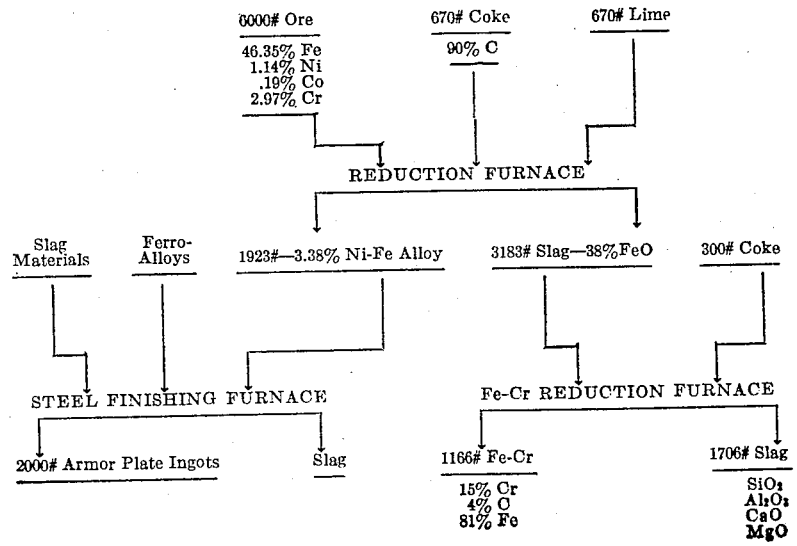

cobalt or chromium and have subsequently processed the slag from this nickel-reduction operation to produce a high carbon chrome-iron alloy containing substantially no nickel, suitable as a raw material for the production of chrome steel, in which case it may be desirable to refinish the high carbon chrome to low carbon chrome or for direct use in foundry operations for producing chrome-iron alloys.

When it is desired to produce steel containing a lower nickel-iron ratio than occurs in the ore, I may blend two or more ores to produce the desired nickel-iron ratio in the ore, since it is desired that part of the iron of the ore be unreduced and held in the slag for the purpose of fluidity, to prevent the reduction of chromium and silicon, and to permit the production of low carbon metal.

When producing 1 ton of 3.25% nickel armor plate steel from ore containing 1.14% nickel, .19% cobalt and 46.35% iron, there will be required 6000 pounds of ore. If this ore is processed in an all-electric furnace operation, there will be required approximately 700 pounds of coke, 700 pounds of lime, and 2500 k. w. hours; while if it is processed in a shaft type furnace as shown in my Patent No. 2,066,665, there will be required approximately 6000 pounds of ore, 1500 pounds of limestone, 1200 pounds of powdered coal, 600 k. w. hours.

While the metal may be finished in the reduction furnace, I prefer to finish it in a separate furnace of the conventional arc type where the fluid metal is finished under a deoxidizing slag and the ferro-alloys added; or if high carbon metal is produced in the nickel-iron reduction operation, it may be transferred as hot metal to an open hearth furnace and finished to specifications in the usual manner of producing open hearth steel from pig iron, scrap, and nickel.

It is thus to be seen that by my new method of treating nickel-bearing iron ores, particularly those containing chromium as well, I am able to produce a nickel-iron alloy of any desired nickel and carbon content and free from chromium, if desired, and I can then recover from the slag in a separate operation, the remainder of the iron and the chromium substantially free from nickel, and from these two products I can make nickel steel containing no chromium, and chromium steels containing no nickel, or may combine with the nickel-iron, such an amount of the chrome-iron as may be required to produce the desired nickel-chrome ratio in the steel.

By my method I am able to produce armor plate from nickel-bearing iron ores without requiring any nickel, chromium, cobalt or iron from other sources than the ore itself, thus producing this material from all virgin metal as contrasted with the usual practice of making armor plate in either the open hearth or the electric furnace from scrap, or pig iron and scrap, with the addition of pure nickel and ferro-alloys.

By my new method, since I am able to control the nickel, carbon, and chromium content of the metal, and to process the slag so as to recover the remainder of the iron and the chromium as a separate chrome-iron metal, these ores may be used extensively and economically for the production of nickel and chrome steels, and form an ideal raw material for the production of armor plate, gun steel, or armor-piercing projectiles.

Although certain examples have been shown above in which a specific analysis of metal is made, these examples are given merely for the purpose of illustration, and it is not my intention to limit the invention in any way to such specific cases, the invention residing in the method of reducing the nickel, or other more readily reducible oxides and a portion of the iron, and then further treating the slag to reduce the remainder of the iron and the chromium, or other less readily reducible oxides.

I claim:

1. The method of reducing iron ores containing nickel oxide and chromium oxide which consists in subjecting the ores to the action of sufficient reducing agent to reduce all of the nickel and only a portion of the iron, but none of the chromium at a temperature sufficient to melt the reduced metal and in the presence of sufficient lime to produce a fluid slag, leaving the remainder of the iron oxide and all of the chromium oxide in the slag and then separating the fluid slag from the fluid metal.

2. The method of reducing iron ores containing nickel oxide and chromium oxide which consists in subjecting the ores to the action of sufficient reducing agent to reduce all of the nickel and only a portion of the iron, but none of the chromium at a temperature sufficient to melt the reduced metal and in the presence of sufficient lime to produce a fluid slag, leaving the remainder of the iron oxide and all of the chromium oxide in the slag and then removing either the fluid slag or the fluid metal.

3. The method of reducing iron ores containing nickel oxide and chromium oxide which consists in subjecting the ores to the action of sufficient reducing agent to reduce all of the nickel and only a portion of the iron, but none of the chromium at a temperature sufficient to melt the reduced metal and in the presence of sufficient lime to produce a fluid slag, leaving the remainder of the iron oxide and all of the chromium oxide in the slag and then separating the fluid slag from the fluid metal, and then subjecting the slag to the action of sufficient reducing agent at a sufficient temperature to reduce substantially all of the chromium oxide and the remainder of the iron oxide in the slag.

4. The method of reducing iron ores containing nickel oxide and chromium oxide which consists in subjecting the ores to the action of sufficient reducing agent to reduce all of the nickel and only a portion of the iron, but none of the chromium at a temperature sufficient to melt the reduced metal and in the presence of sufficient lime to produce a fluid slag, leaving the remainder of the iron oxide and all of the chromium oxide in the slag and then separating the fluid slag from the fluid metal, and finishing the fluid nickel steel to specifications.

5. The method of reducing iron ores containing nickel oxide and chromium oxide which consists in subjecting the ores to the action of sufficient reducing agent to reduce all of the nickel and only a portion of the iron, but none of the chromium at a temperature sufficient to melt the reduced metal and in the presence of sufficient lime to produce a fluid slag, leaving the remainder of the iron oxide and all of the chromium oxide in the slag and then separating the fluid slag from the fluid metal, and finishing the fluid nickel steel to specifications, then subjecting the fluid slag to sufficient reducing agent at a sufficient temperature to reduce the chromium oxides and the remainder of the iron oxides in the slag.

THADDEUS F. BAILY.